United States Patent Office 3,446,608
Patented May 27, 1969

3,446,608
ANTIOXIDANT COMPOSITION AND USE THEREOF
Marcus R. Schrein, Barrington, Ill., assignor to Universal Oil Products Company, Des Plaines, Ill., a corporation of Delaware
No Drawing. Filed Feb. 28, 1966, Ser. No. 530,345
Int. Cl. C10l 1/22
U.S. Cl. 44—61                        10 Claims

ABSTRACT OF THE DISCLOSURE

A mixture of from about 10% to about 90% by weight of hardwood tar distillate and from about 90% to about 10% by weight of N-phenyl-N'-sec-alkyl-ortho-phenylenediamine suitable for use as an antioxidant in gasoline.

---

This invention relates to a novel antioxidant composition which offers important advantages in the stabilization of gasoline.

With the improved technology of modern petroleum refining practices, gasoline products from these operations appear to possess improved stability. While these gasolines are of improved stability, they still require the addition of an antioxidant in order to insure that the gasoline will not undergo deterioration during storage and transportation. However, the antioxidant required in these gasolines need not be of extremely high potency which necessarily means higher cost. Therefore, there is an important need for a low cost antioxidant of satisfactory potency to insure the desired stability to the gasoline.

The present invention is directed to a novel antioxidant composition which is of low cost and yet of satisfactory potency to meet the requirements hereinbefore set forth. In addition to this important advantage, it has been found that the antioxidant composition of the present invention possesses synergistic properties and results in inhibitor potency beyond that which would be expected from the use of each of the components separately. This in turn means that a lower concentration of the antioxidant composition may be used to obtain the desired stability or that use of the same concentration will impart greater stability than obtainable when using each of the components separately.

In one embodiment, the present invention relates to an antioxidant mixture of hardwood tar distillate and N-phenyl-N'-sec-alkyl-ortho-phenylenediamine.

In a specific embodiment the antioxidant composition contains from about 10% to about 90% by weight and more particularly from about 50% to about 80% by weight of hardwood tar distillate and from about 10% to about 90% by weight and more particularly from about 20% to about 50% by weight of N-phenyl-N'-sec-alkyl-ortho-phenylenediamine.

Any suitable hardwood tar distillate is used in the antioxidant composition of the present invention. Wood tar distillate is obtained by the distillation of hardwoods including hickory, oak, beech, walnut, etc. The distillate so obtained is a mixture of phenolic and non-phenolic compounds, including pyrogallol and 5-alkyl-pyrogallols, monomethyl ethers of pyrogallol and of 5-alkyl-pyrogallol, dimethyl ethers of pyrogallol and of 5-alkyl-pyrogallol, alkylated guaiacols, neutral oils, etc. The wood tar distillate generally is first settled in order to separate a settled tar oil from soluble oil. The settling may be effected at atmospheric temperature but in many cases is effected at an elevated temperature which may range up to about 210° F. The settling at elevated temperature also effects removal of volatile components from the wood tar distillate. The settled wood tar distillate generally is then fractioned to separate a selected fraction for use as an antioxidant. One selected fraction available commercially has a boiling range of from about 400° to about 600° F., a Universal viscosity at 100° F. of 88 seconds and a pour point of 32° F.

Any suitable N - phenyl - N'-sec-alkyl-ortho-phenylenediamine is used in forming the antioxidant composition and preferably contains from about 3 to about 12 carbon atoms in said alkyl group. A particularly preferred compound is N-phenyl-N'-sec-butyl-ortho-phenylenediamine. Other compounds include N-phenyl-N'-isopropyl-ortho-phenylenediamine, N - phenyl - N'-sec-amyl-ortho-phenylenediamine, N - phenyl - N'-sec-hexyl-ortho-phenylenediamine, N - phenyl-N'-sec-heptyl-orthophenylenediamine, N-phenyl-N'-sec-octyl-ortho-phenylenediamine, N-phenyl-N' - sec - nonyl-ortho-phenylenediamine, N-phenyl-N'-sec-decyl-ortho - phenylenediamine, N-phenyl-N'-sec-undecyl-ortho - phenylenediamine and N-phenyl-N'-sec-dodecyl-ortho-phenylenediamine. While the N-phenyl-N'-sec-alkyl-ortho-phenylenediamine is preferred, it is understood that the corresponding N-naphthyl-N'-sec-alkyl-ortho-phenylenediamine may be used. Also it is understood that a mixture of the N - phenyl - N' - sec-alkyl-ortho-phenylenediamines and/or a mixture of N-naphthyl-N'-sec-alkyl-ortho-phenylenediamines may be used when desired.

The antioxidant composition will contain the hardwood tar distillate and the N-phenyl-N'-sec-alkyl-ortho-phenylenediamine in suitable proportions to produce the desired results. In general, these concentrations comprise from about 10% to about 90% by weight of hardwood tar distillate and from about 90% to about 10% by weight of N-phenyl-N'-sec-alkyl-ortho-phenylenediamine. In a more specific embodiment, these components will be used in a concentration of from about 50% to about 80% by weight of hardwood tar distillate and from about 20% to about 50% by weight of N-phenyl-N'-sec-alkyl-ortho-phenylenediamine. Because of the lower cost of the hardwood tar distillate, it generally is preferred that the hardwood tar distillate comprises at least 50% by weight of the mixture.

In addition to the important property of synergism, the novel composition of the present invention offers many advantages. N - phenyl - N' - sec-butyl-ortho-phenylenediamine, for example, is a solid at normal temperature and therefore preferably is formed as a solution in a suitable solvent for use as an additive. The hardwood tar distillate is a liquid, in which the N-phenyl-N'-sec-butyl-ortho-phenylenediamine is largely soluble. Accordingly, the hardwood tar distillate is used as at least a portion of the solvent and thus replaces at least part of the inert solvent heretofore used. However, it still is preferable to use at least a small amount of solvent in the antioxidant composition and any suitable solvent may be used. The solvent may comprise gasoline, selected aromatic fraction as benzene, toluene, xylene, cumene or mixture thereof, or selected paraffin fraction, such as hexane, heptane, octane, nonane, etc., or mixture thereof. However, in keeping with the desire to form a low cost antioxidant composition, the solvent preferably comprises an inexpensive by-product solvent such as, for example, xylene bottoms which are available at a reduced cost.

As still another advantage to the antioxidant composition of the present invention, the hardwood tar distillate is caustic soluble and water soluble. Accordingly, should the gasoline inadvertently come in contact with caustic and/or water, the hardwood tar distillate may be extracted from the gasoline. By using the antioxidant mixture of the present invention, at least a portion of an inhibitor will remain in the gasoline and thus will impart at least some protection to the gasoline in the event that the gasoline is inadvertently contacted with caustic and/or water.

Still another advantage of the antioxidant composition of the present invention is that the composition possesses at least moderate inhibitor sweetening properties. Such inhibitor sweetening properties are not possessed by the wood tar distillate when used by itself, and the use of the mixture does lend at least some inhibitor sweetening properties to the gasoline. In many cases the inhibitor sweetening property of the antioxidant composition is sufficient to meet the requirements. However, when greater inhibitor sweetening is required, the antioxidant composition also may contain an additional additive possessing such properties. Generally, such additive is more expensive and accordingly is used in a concentration of less than about 35% and preferably less than about 25%. Accordingly, the amount of such additional inhibitor may range from about 1 to about 25% and preferably from about 3 to about 20% of the antioxidant composition. Suitable preferred additional compounds for such purpose are N,N'-sec-alkyl-p-phenylenediamines in which each alkyl group contains from 3 to about 12 carbon atoms. A particularly preferred compound for such use is N,N'-sec-butyl-p-phenylenediamine.

The antioxidant composition of the present invention is used in a stabilizing concentration in the gasoline. In general, this concentration is within the range of from about 0.0001% to about 0.1% and more particularly from about 0.001% to about 0.01% by weight of the gasoline. It is understood that the antioxidant composition may be used in conjunction with other additives which are incorporated in the gasoline as, for example, tetraethyl lead or other antiknock agent, metal deactivator, deicer, detergent, dye, etc.

The following examples are introduced to illustrate further the novelty and utility of the present invention but not with the intention of unduly limiting the same.

EXAMPLE I

The gasoline used in his example was an uninhibited blended gasoline comprising approximately equal volumes of catalytic reformed gasoline and catalytically cracked gasoline and a very small amount of light straight-run gasoline. This gasoline without additive had an induction period of 100 minutes.

One antioxidant composition was prepared to contain 50% by weight of wood tar distillate having a boiling range of 400° to 600° F., 10% by weight of N-phenyl-N'-sec-butyl-ortho-phenylenediamine and 40% by weight of an aromatic solvent. This antioxidant composition was evaluated in three different concentrations in different samples of the gasoline described above. The results of these evaluations and the predicted induction periods are reported in the following table:

| Concentration of antioxidant composition, percent | Predicted induction period | Actual induction period |
| --- | --- | --- |
| 0.005 | 295 | 335 |
| 0.007 | 385 | 415 |
| 0.01 | 495 | 540 |

From the data in the above table it will be seen that the actual induction period was greater in all cases than the induction period predicted on the basis of the specific components. The predicted induction period was determined as follows. Using the first set of data for illustrative purposes, the hardwood tar distillate is present in the composition in a concentration of 0.0025% (50% of 0.005%). When evaluated alone in this concentration in another sample of the gasoline, it increased the induction period from 100 to 170 minutes, thus showing an increase of 70 minutes. The N-phenyl-N'-sec-butyl-ortho-phenylenediamine is present in the antioxidant composition in a composition in a concentration of 0.0005% and, when this amount was added separately to another sample of the gasoline, it increased the induction period from 100 to 225, thus showing an increase of 125 minutes. This increase plus the previous 70 minutes increase and restoring the original 100 minutes gives a predicted induction period of 295 minutes. Surprisingly, the induction period actually obtained was 335 minutes, thus showing an increase of 40 minutes or more than 10%.

The other predicted induction periods were obtained in a similar manner by adding the increases obtained with the specific concentrations of the individual components. Surprisingly, in all cases the actual induction periods obtained exceeded the induction periods which would be expected.

EXAMPLE II

Another antioxidant composition was prepared to contain 50% by weight of hardwood distillate, 20% by weight of N-phenyl-N'-sec-butyl-ortho-phenylenediamine and 30% by weight of aromatic solvent. This antioxidant composition was evaluated in different concentrations in other samples of the same gasolines described in Example I and the results are reported in the following table:

| Concentration of antioxidant composition, percent | Predicted induction period | Actual induction period |
| --- | --- | --- |
| 0.0025 | 270 | 305 |
| 0.005 | 415 | 430 |
| 0.01 | 655 | 680 |

Here again it will be noted that the actual induction periods obtained exceeded the predicted induction periods in all cases.

EXAMPLE III

The antioxidant composition of the present invention also was evaluated in a 6-month storage test. The gasoline used in this test is a commercially catalytically cracked gasoline and was stored, with and without the antioxidant composition, in dark storage at 110° F. for 6 months. The additive composition comprised 0.01% by weight of a mixture of 50% by weight of hardwood tar distillate (400°–600° F. boiling range), 10% by weight of N-phenyl-N'-sec-butyl-ortho-phenylenediamine, and 40% by weight of aromatic solvent. The results of these evaluations are reported in the following table:

| Property | Control sample (no additive) | | Sample with additive composition | |
| --- | --- | --- | --- | --- |
| | Start | After 6 months | Start | After 6 months |
| Peroxide No | 0.3 | 152 | 0.2 | 0.6 |
| ASTM gum, mg./100 ml. | 2.8 | 5,430 | 1.9 | 2.9 |

From the data in the above table, it will be seen that the antioxidant composition was very effective in maintaining a low peroxide number and a low ASTM gum. This further demonstrates the potency of the antioxidant composition in retarding deterioration of the gasoline.

EXAMPLE IV

The antioxidant composition of the example comprises a mixture of 60% by weight of hardwood tar distillate, 30% by weight of N-phenyl-N'-isopropyl-ortho-phenylenediamine and 10% by weight of N,N'-di-sec-butyl-p-phenylenediamine. This antioxidant composition is used in cracked gasoline in which inhibitor sweetening properties also are desired.

EXAMPLE V

The antioxidant composition of this example is a mixture of 50% by weight of hardwood tar distillate, 40% by weight of N-phenyl-N'-sec-hexyl-ortho-phenylenediamine and 10% by weight of aromatic solvent.

I claim as my invention:

1. A mixture of from about 10% to about 90% by weight of hardwood tar distillate and from about 90% to about 10% by weight of N-phenyl-N'-sec-alkyl-ortho-phenylenediamine.

2. The mixture of claim 1 wherein said N-phenyl-N'-sec-alkyl-ortho-phenylenediamine contains from 3 to about 12 carbon atoms in said alkyl.

3. The mixture of claim 2 wherein said N-phenyl-N'-sec-alkyl - ortho - phenylenediamine is N-phenyl-N'-sec-butyl-ortho-phenylenediamine.

4. The mixture of claim 2 wherein said N-phenyl-N'-sec - alkyl-ortho - phenylenediamine is N-phenyl-N'-iso-propyl-ortho-phenylenediamine.

5. The mixture of claim 2 wherein said N-phenyl-N'-sec - alkyl-ortho - phenylenediamine is N-phenyl-N'-sec-hexyl-ortho-phenylenediamine.

6. The mixture of claim 1 also containing an N,N'-di-sec-alkyl-p-phenylenediamine having from 3 to 12 carbon atoms in each alkyl.

7. The mixture of claim 1 wherein said hardwood tar distillate has a boiling range of from about 400° to about 600° F.

8. The mixture of claim 1 incorporated in a stabilizing concentration in gasoline.

9. The mixture of claim 2 incorporated in a stabilizing concentration in gasoline.

10. The mixture of claim 3 incorporated in a stabilizing concentration in gasoline.

References Cited

UNITED STATES PATENTS

| | | | |
|---|---|---|---|
| 1,816,811 | 7/1931 | Hoffert | 44—74 |
| 2,023,110 | 12/1935 | Wilson | 44—74 |
| 2,054,276 | 9/1936 | Wilson | 44—74 |
| 2,156,158 | 4/1939 | Olson et al. | 44—62 |
| 2,334,564 | 11/1943 | Lewis | 44—61 |
| 3,290,376 | 12/1966 | Chenicek et al. | 44—64 |

FOREIGN PATENTS

| | | |
|---|---|---|
| 410,115 | 11/1932 | Great Britain. |
| 83,037 | 4/1935 | Sweden. |

DANIEL E. WYMAN, *Primary Examiner.*

Y. H. SMITH, *Assistant Examiner.*

U.S. Cl. X.R.

44—74